US012651168B2

(12) United States Patent
Schlicht et al.

(10) Patent No.: US 12,651,168 B2
(45) Date of Patent: Jun. 9, 2026

(54) METHOD FOR OPERATING A DEEP NEURAL NETWORK

(71) Applicant: Volkswagen Aktiengesellschaft, Wolfsburg (DE)

(72) Inventors: Peter Schlicht, Wolfsburg (DE); Nico Maurice Schmidt, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 1047 days.

(21) Appl. No.: 17/613,158

(22) PCT Filed: May 6, 2020

(86) PCT No.: PCT/EP2020/062636
§ 371 (c)(1),
(2) Date: Nov. 22, 2021

(87) PCT Pub. No.: WO2020/233991
PCT Pub. Date: Nov. 26, 2020

(65) Prior Publication Data
US 2022/0222537 A1 Jul. 14, 2022

(30) Foreign Application Priority Data
May 23, 2019 (DE) ..................... 10 2019 207 580.0

(51) Int. Cl.
G06N 3/084 (2023.01)
G06N 3/04 (2023.01)
(52) U.S. Cl.
CPC .............. G06N 3/084 (2013.01); G06N 3/04 (2013.01)

(58) Field of Classification Search
CPC ................................. G06N 3/084; G06N 3/04
See application file for complete search history.

(56) References Cited

U.S. PATENT DOCUMENTS 5,825,646 A * 10/1998 Keeler ............... G05B 13/0285
                                                      700/48
8,142,998 B2 3/2012 Liew et al. .................. 435/6.11
(Continued)

FOREIGN PATENT DOCUMENTS

CN        105891215 A    8/2016    ............. G01N 21/88
CN        107895359 A    4/2018
(Continued)

OTHER PUBLICATIONS

Gurkin, Metin N. et al., "Optimal Selection of Neural Network Architecture for CAD Using Simulated Annealing," Proceedings of the 22nd Annual International Conference of the IEEE Engineering in Medicine and Biology Society, pp. 3052-3055.
(Continued)

*Primary Examiner* — Sherrod L Keaton
(74) *Attorney, Agent, or Firm* — Slayden Grubert Beard PLLC

(57) ABSTRACT

The invention relates to a method for operating a deep neural network, wherein the deep neural network is operated with multiple layers between an input layer and an output layer, and wherein, in addition, at least one classic filter is used in the deep neural network between the input and the output layer. The invention also relates to a device for data processing and to a computer-readable storage medium.

16 Claims, 2 Drawing Sheets

(56) References Cited

U.S. PATENT DOCUMENTS

| | | | | |
|---|---|---|---|---|
| 10,671,082 | B2 | 6/2020 | Huang et al. | |
| 11,423,300 | B1 | 8/2022 | Ritter et al. | |
| 2004/0205037 | A1 | 10/2004 | Mrziglod et al. | 706/20 |
| 2014/0095420 | A1* | 4/2014 | Chun | G16H 40/67 |
| | | | | 706/46 |
| 2018/0075594 | A1 | 3/2018 | Brauer | |
| 2018/0096232 | A1 | 4/2018 | Danielsson et al. | |
| 2018/0144203 | A1 | 5/2018 | Moosaei et al. | |
| 2018/0157933 | A1 | 6/2018 | Brauer et al. | |
| 2018/0173954 | A1 | 6/2018 | Zink et al. | |
| 2018/0308012 | A1 | 10/2018 | Mummadi et al. | |
| 2018/0336425 | A1* | 11/2018 | Kadav | G06N 3/082 |
| 2019/0066133 | A1* | 2/2019 | Cotton | G06Q 30/0202 |
| 2019/0130224 | A1 | 5/2019 | Tiecke et al. | |
| 2020/0134382 | A1* | 4/2020 | Zhuravlev | G06F 18/217 |
| 2020/0293892 | A1 | 9/2020 | Zhou | |
| 2020/0311798 | A1 | 10/2020 | Forsyth et al. | |

FOREIGN PATENT DOCUMENTS

| | | | | |
|---|---|---|---|---|
| CN | 108229276 | A | 6/2018 | G06K 9/00 |
| CN | 108615071 | A | 10/2018 | G06N 3/02 |
| CN | 109753973 | A | 5/2019 | G06K 9/40 |
| DE | 19649618 | A1 | 6/1998 | G01S 13/50 |
| DE | 102018200724 | A1 | 10/2018 | G06N 3/08 |
| DE | 102019207573 | A1 | 11/2020 | G06F 21/00 |
| DE | 102019207575 | A1 | 11/2020 | G06F 21/00 |
| DE | 102019207580 | A1 | 11/2020 | G06K 9/62 |
| WO | 2018/085697 | A1 | 5/2018 | G06N 3/04 |
| WO | 2020/233961 | A1 | 11/2020 | G06N 3/02 |
| WO | 2020/233991 | A1 | 11/2020 | G06N 3/04 |
| WO | 2020/233992 | A1 | 11/2020 | G06N 3/04 |

OTHER PUBLICATIONS

Calderón, Andrés et al., "Handwritten Digit Recognition Using Convolutional Neural Networks and Gabor Filters," Proceedings of the International Congress on Computational Intelligence CIIC, 9 pages.

Kwolek, Bogdan, "Face Detecction Using Convolutional Neural Networks and Gabor Filters," Artificial Neural Networks: Biological Inspirations—ICANN 2005 Lecture Notes in Computer Science, pp. 551-556.

Wu, Yihui et al., "Traffic Sign Detection based on Convolutional Neural Networks," The IEEE 2013 International Joint Conference on Neural Networks, 7 pages.

Goodfellow, Ian J. et al., "Explaining and Harnessing Adversarial Examples," URL: https://arxiv.org/pdf/1412.6572.pdf, 11 pages.

Papernot, Nicolas et al., "Distillation as a Defense to Adversarial Perturbations Against Deep Neural Networks," 2016 IEEE Symposium on Security and Privacy, pp. 582-597.

Kinnikar, Ashwini et al., "Face Recognition Using Gabor Filter and Convolutional Neural Network," Informatics and Analytics, ACM, 4 pages.

Li, Xin et al., "Adversarial Examples Detection in Deep Networks with Convulutional Filter Statistics," arxiv.org, Cornell University Library, 8 pages.

Rashid, Tareq, Part 3 Neural Network MNIST Data with Rotations, Make Your Own Neural Network, URLs: https://github.com/makeyourownneuralnetwork/makeyourownneuralnetwork/blob/master/part3_neural_network_mnist_data_with_rotations.ipynb and https://raw.githubusercontent.com/makeyourownneuralnetwork/makeyourownneuralnetwork/master/part3_neural network_mnist_data_with_rotations.ipynb, 9 pages.

Sarwar, Syed Shakib et al., "Gabor Filter Assisted Energy Efficient Fast Learning Convulutional Neural Networks," IEEE/ACM Symposium on Low Power Electronics and Design, 6 pages.

Fujieda, Shin et al., "Wavelet Convolutional Neural Networks," arXiv Preprint, URL: https://arxiv.org/abs/1805.08620v1, 10 pages.

Zantedeschi, Valentina et al., "Efficient Defenses Against Adversarial Attacks," Proceedings of the 10th ACM Workshop on Artificial Intelligence and Security, pp. 39-49.

Gao, Ji et al., "Deepcloak: Masking Deep Neural Network Models for Robustness Against Adversarial Samples," Workshop Track—ICLR 2017, URL: https://arxiv.org/pdf/1702.06763.pdf, 8 pages.

Molchanov, Pavlo et al., "Pruning Convolutional Neural Networks for Resource Efficient Inference," URL: https://arxiv.org/pdf/1611.06440.pdf, 17 pages.

Li, Jiakun et al., "Using Gabor Filter in 3D Convolutional Neural Networks for Human Action Recognition," 36th Chinese Control Conference, Technical Committee on Control Theory, pp. 11139-11144.

Chen, Yushi et al., "Hyperspectral Images Classification with Gabor Filtering and Convolutional Neural Network," IEEE Geoscience and Remote Sensing Letters, vol. 14, No. 12, pp. 2355-2359.

Hosseini, Sepidehsadat et al., "Age and Gender Classification Using Wide Convolutional Neural Network and Gabor Filter," 2018 International Workshop on Advanced Image Technology, 3 pages.

Luo, Bo et al., "Towards Imperceptible and Robust Adversarial Example Attacks Against Neural Networks," arxiv.org, Cornell University Library, 8 pages.

Özbulak, Gökhan et al., "Initialization of Convolutional Neural Networks by Gabor Filters," 26th Signal Processing and Communications Applications Conference, 6 pages.

Tian, Yuchi et al., "DeepTest: Automated Testing of Deep-Neural-Network-Driven Autonomous Cars," Proceedings of the 40th International Conference on Software Engineering, pp. 303-314.

Liao, Fangzhou et al., "Defense Against Adversarial Attacks Using High-Level Representation Guided Denoiser," 2018 IEEE/CVF Conference on Computer Vision and Pattern Recognition, pp. 1778-1787.

Rakin, Adnan Siraj et al., "Defend Deep Neural Networks Against Adversarial Examples via Fixed and Dynamic Quantized Activation Functions," arxiv.org, Cornell University Library, XP081113638, 15 pages.

Jiang, Chenzhi et al., "Gabor Binary Layer in Convolutional Neural Networks," 25th IEEE International Conference on Image Processing, pp. 3408-3412.

Wang, Siyue et al., "Defending DNN Adversarial Attacks with Pruning and Logits Augmentation," 2018 IEEE Global Conference on Signal and Information Processing, pp. 1144-1148.

Ma, Shiqing et al., "NIC: Detecting Adversarial Samples with Neural Network Invariant Checking," Proceedings of the 26th Network and Distributed System Security Symposium, 15 pages.

Zadeh, Milad Mohammad et al., "Fast Facial Emotion Recognition Using Convolutional Neural Networks and Gabor Filters," IEEE 5th Conference on Knowledge Based Engineering and Innovation, pp. 577-581.

Chen, Hao-Yun et al., "Improving Adversarial Robustness via Guided Complement Entropy," URL: https://arxiv.org/pdf/1903.09799v1.pdf, 10 pages.

Alekseev, Andrey et al., "GaborNet: Gabor Filters with Learnable Parameters in Deep Convolutional Neural Networks," arxiv.org, Cornell University Library, 10 pages.

German Office Action, Application No. 102019207580.0, 8 pages.

German Office Action, Application No. 102019207575.4, 8 pages.

German Office Action, Application No. 102019207573.8, 9 pages.

International Search Report and Written Opinion, Application No. PCT/EP2020/062110, 11 pages.

International Search Report and Written Opinion, Application No. PCT/EP2020/062638, 10 pages.

International Search Report and Written Opinion, Application No. PCT/EP2020/062636, 10 pages.

Szegedy, Christian et al., "Going Deeper with Convolutions," URL: https://arxiv.org/pdf/1409.4842, 9 pages.

Zheng, Stephan et al., "Improving the Robustness of Deep Neural Networks via Stability Training," URL: https://arxiv.org/pdf/1604.04326, 9 pages.

Yim, Junho et al., "A Gift from Knowledge Distillation: Fast Optimization, Network Minimization and Transfer Learning," IEEE Conference on Computer Vision and Pattern Recognition, URL:

(56) References Cited

OTHER PUBLICATIONS https://openaccess.thecvf.com/content_cvpr_2017/papers/Yim_A_
Gift_From_CVPR_2017_paper.pdf, 9 pages.
Aguilar, Gustavo et al., "Knowledge Distillation from Internal
Representations," URL: https://arxiv.org/pdf/1910.03723, 8 pages.
U.S. Non-Final Office Action, U.S. Appl. No. 17/612,241, 36 pages.
Chinese Office Action, Application No. 202080038184.4, 8 pages.
U.S. Non-Final Office Action, U.S. Appl. No. 17/612,330, 35 pages.
U.S. Final Office Action, U.S. Appl. No. 17/612,330, 24 pages.
Sabour, Sara et al., "Adversarial Manipulation of Deep Represen-
tations," arXiv.org, 18 pages.
European Office Action, Application No. 20724043.3, 8 pages.
U.S. Final Office Action, U.S. Appl. No. 17/612,241, 22 pages.
Shi, Hehuan et al., "PCA Pre-Trained Convolutional Neural Net-
work Target Recognition Algorithm," Journal of Xi'an University of
Electronic Science and Technology, vol. 43, No. 3, 6 pages (Chinese
w/ English abstract).
Chinese Office Action, Application No. 202080038184.4, 9 pages.

* cited by examiner

METHOD FOR OPERATING A DEEP NEURAL NETWORK

CROSS-REFERENCE TO RELATED APPLICATIONS

This application claims priority to German Patent Application No. DE 10 2019 207 580.0, filed on May 23, 2019 with the German Patent and Trademark Office. The contents of the aforesaid Patent Application are incorporated herein for all purposes.

TECHNICAL FIELD

The invention relates to a method for operating a deep neural network. The invention also relates to a device for data processing, a computer program, and to a computer-readable storage medium.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Machine learning, for example on the basis of neural networks, has great potential for an application in modern driver assistance systems and automated motor vehicles. In this case, functions based on deep neural networks process raw sensor data (by way of example, from cameras, radar or lidar sensors) in order to derive relevant information therefrom. This information comprises, by way of example, a type and a position of objects in an environment of the motor vehicle, a behavior of the objects or a road geometry or topology.

Among the neural networks, convolutional neural networks have in particular proven to be particularly suitable for applications in image processing. Convolutional neural networks extract various high-quality features from input data (e.g., image data) in stages in an unmonitored form. In this case, the convolutional neural network independently develops feature maps, during a training phase, based on filter channels which process the input data locally in order to derive local characteristics as a result. These feature maps are then processed again by further filter channels which derive higher-quality feature maps therefrom. On the basis of this information, which is compressed in such a way from the input data, the deep neural network finally derives its decision and provides said decision as output data.

However, while convolutional neural networks outperform classic approaches in terms of functional accuracy, they also have disadvantages. Thus, interference in captured sensor data or attacks based on adversarial interference can, for example, result in a misclassification or incorrect semantic segmentation taking place despite a semantically unchanged content in the captured sensor data. Attempts are therefore being made to make neural networks robust against this type of interference.

SUMMARY

A need exists to provide a method and a device for operating a deep neural network, in which the deep neural network is more robust against interference.

The need is addressed by a method and a device having the features of the independent claims. Embodiments of the invention are described in the dependent claims, the following description, and the drawings.

DESCRIPTION

Figure 1:
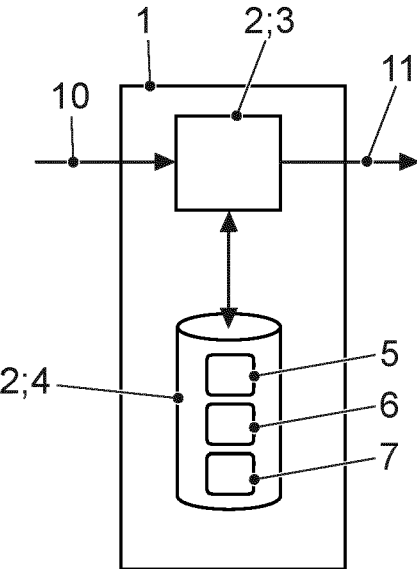
FIG. 1 shows a schematic representation of an embodiment of the device for data processing.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a method for operating a deep neural network is made available, wherein the deep neural network is operated with multiple layers between an input layer and an output layer, and wherein, in addition, at least one classic filter is used in the deep neural network between the input layer and the output layer.

In some embodiments, a device for data processing is also provided, comprising means for executing the steps of the method according to the teachings herein. In this case, the means may in particular comprise a computing apparatus and a memory.

A computer program is further provided in some embodiments, comprising commands which, when the computer program is run by a computer, prompt the latter to execute the steps of the method according to the teachings herein.

Furthermore, a computer-readable storage medium is provided in some embodiments, comprising commands which, when run by a computer, prompt the latter to execute the steps of the method according to the teachings herein.

The method and the device make it possible to increase a robustness of a neural network, in particular of a convolutional neural network, with respect to interference. This is done by additionally using at least one classic filter as well as the usually randomly initialized filters for feature extraction in the deep neural network. In this case, the at least one classic filter is in particular an integral part of a structure of the deep neural network. In the case of this at least one classic filter, filter parameters are in particular specified when the deep neural network is initialized, that is to say at the start of a training phase. The specified filter parameters can, for example, be selected on the basis of estimates and/or empirical values. Output data of the at least one classic filter is provided to the deep neural network in addition to the unfiltered input data, which has not passed through the at least one classic filter, and to the input data filtered by means of the filter channels. In other words, the features or feature maps extracted by the at least one classic filter constitute a subset of all the features or feature maps used for inferring. This makes it possible for the at least one classic filter to extract particularly discriminative features from input data provided to the input layer, which input data evades the randomly initialized filters or filter channels as a general rule. The teachings herein are based on the realization that deep neural networks are, as a general rule, not necessarily trained for discriminative features in the input data in the context of the training phase, but that features, to which the deep neural network reacts sensitively following the training to infer the output data, are often not very meaningful and therefore more susceptible to interference. Overall, a more robust behavior of the deep neural network with respect to interference (e.g., in the form of adversarial disturbances), which merely produce a semantically irrelevant change in the input data, may be achieved.

A benefit of the method and of the device is that a hybrid approach may be implemented, in which both classic filters and taught filters or filter channels are integrated in the deep neural network. Overall, this may increase the robustness of the deep neural network with respect to interference.

A neural network is in particular an artificial neural network, in particular a convolutional neural network. The neural network will be or is in particular trained for a specific perception function, for example a perception of pedestrians or other objects in captured camera images.

The input data of the deep neural network may be one-dimensional or multidimensional. Accordingly, training data of the training data set used for training is one-dimensional or multi-dimensional, wherein the training data is marked ("labeled") in terms of a semantically meaningful content. For example, the training data may be captured camera images which are marked in terms of a semantically meaningful content (e.g., pedestrians). In particular, the training data and the input data are two-dimensional data, that is to say image data captured by means of a camera.

A training phase and an inference phase of the deep neural network are otherwise executed in a manner known per se.

In particular, the method is executed by means of a computing apparatus which may access a memory. The computing apparatus may be configured as a combination of hardware and software, for example as program code which is run on a microcontroller or microprocessor.

A classic filter may in particular have a one-dimensional or multi-dimensional input and a one-dimensional or multi-dimensional output. Unlike a filter channel usually used in a deep neural network, in which the filter channel is initialized with random parameters when the deep neural network is initialized, the classic filter is initialized with fixed filter parameters when the deep neural network is initialized. In other words, a classic filter has a fixed filter function which may be parameterized with the aid of filter parameters; these filter parameters are, however, fixed during initialization and are not initialized randomly.

In particular, when image data is processed by the deep neural network, a classic filter should comprise a classic computer-vision method. In particular, such a method may be a method for image processing.

In this case, a classic filter may in particular be one of the following:

Center-surround filter of varying size,

Edge filter (e.g., by means of the Canny algorithm),

Contour filter,

Corner filter,

Pattern filter (e.g., for a hexagon or another geometric figure, etc.),

Gradient filter,

Contrast pattern filter,

Writing filter for identifying writing,

Deriving a position-dependent density map for stipulating an attention filter,

Image sharpness/image blur filter, etc.

Filter parameters are parameters of the at least one classic filter. If the filter is, for example, an edge filter for image data, a filter parameter is, for example, a sensitivity value or threshold which indicates the value as of which a pixel or a region in an image is treated as an edge.

It is in particular provided that the deep neural network is a convolutional neural network. In this case, the at least one classic filter is arranged in front of or in a feature layer of the convolutional neural network, that is to say in particular in front of a backpropagation network of the convolutional neural network. In this case, output data of the at least one classic filter is fed to the backpropagation network in addition to the feature maps extracted by the filter channels.

In some embodiments, it is provided that filter parameters of the at least one classic filter are kept constant during a training phase of the deep neural network. As a result, filter parameters of the at least one classic filter may be specified and also retained during the training phase and a subsequent application of the trained deep neural network in an inference phase. In particular, the at least one filter may, as a result, be deliberately set up for particularly discriminative features in the input data. This is particularly beneficial if filter functions are known for input data, for which filter functions optimal filter parameters for extracting particularly discriminative features are already known.

In some embodiments, it is specified that at least one part of filter parameters of the at least one classic filter is changed during a training phase of the deep neural network. As a result, filter parameters of the at least one classic filter may be taught in addition to the parameters of the remaining deep neural network during the training phase. Since, during training of the deep neural network, a deviation (=loss) of an output from a ground truth (or the labels of the training data) is determined at the output layer and parameters of the deep neural network are adapted as a function of the derivation of this deviation established (for multiple training data) in the context of a gradient descent during the training, the filter parameters of the classic filters must in particular depend in a differentiable manner on a cost function (loss function) used for training the deep neural network.

If multiple classic filters are present, it may also be provided that only one part of the classic filters is changed during the training phase by way of changing the associated filter parameters; filter parameters of another part of the classic filters are kept constant, by contrast, at the filter parameters specified during the initialization.

In some embodiments, it is provided that at least one part of the filter parameters of the at least one classic filter is adapted with a lower learning rate than the remaining deep neural network. As a result, a compromise may be achieved between a possibility of adapting filter parameters of the classic filters in the context of the training phase and a specification of filter parameters. It may further be achieved that a function of the deep neural network may be understood, at least in connection with the at least one classic filter, in terms of effect, that means with regard to certain discriminative features. Overall, the deep neural network may be configured to be more robust due to a lower learning rate, since the classic filter reacts less sensitively to slightly altered input data and, subsequently, too strong an adjustment of the filter parameters in the context of the training phase may be prevented.

In some embodiments, it is provided that the at least one classic filter is operated directly after the input layer and/or in the vicinity of the input layer of the deep neural network. As a result, discriminative features may be extracted close to the input. This may increase a beneficial effect on the robustness of the deep neural network. In this case, in the vicinity of the input layer means in particular that the at least one classic filter is arranged in the ith layer after the input layer in the deep neural network, wherein i≤10, for example i≤5, and for example i≤3.

In some embodiments, it is provided that an output of the at least one classic filter is fed to multiple layers of the deep neural network. This helps with being able to locate features learnt by the deep neural network relative to the original input data. In particular, in the case of image data, this makes possible a robust location of image features (e.g., edge lines, objects, etc.) to exact pixel regions in the image data. In particular, recognized image features may be located in a robust manner relative to the classic filter maps.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

A schematic representation of a device 1 for executing the method is shown in FIG. 1. The device 1 comprises means 2 for executing the method. The means 2 comprise a computing apparatus 3 and a memory 4. A structure and parameters of a deep neural network 5 are stored in the memory 4. In order to perform the method, in particular in order to train the deep neural network 5 and in order to apply the deep neural network 5 during an inference phase, the computing apparatus 3 may access the memory 4 and perform arithmetic operations in order to operate the deep neural network 5. The computing apparatus 3 may be configured as a combination of hardware and software, for example as a computer program which is run on a microcontroller or microprocessor.

Marked ("labeled") training data 6 and filter parameters 7 of at least one classic filter are also stored in the memory 4, at least during a training phase.

During an inference phase, input data 10 is fed to the device 1 or the (trained) deep neural network 5. This may be, for example, captured camera data, on which the deep neural network 5 executes a perception function. After a completed inference phase, the deep neural network 5 or the device 1 supplies output data 11 which supplies, for example, a classification result of the input data 10. If the perception function comprises, for example, the recognition of pedestrians in the captured camera data, probability values for the presence of pedestrians in the captured camera data are thus provided, for example, as output data.

Figure 2:
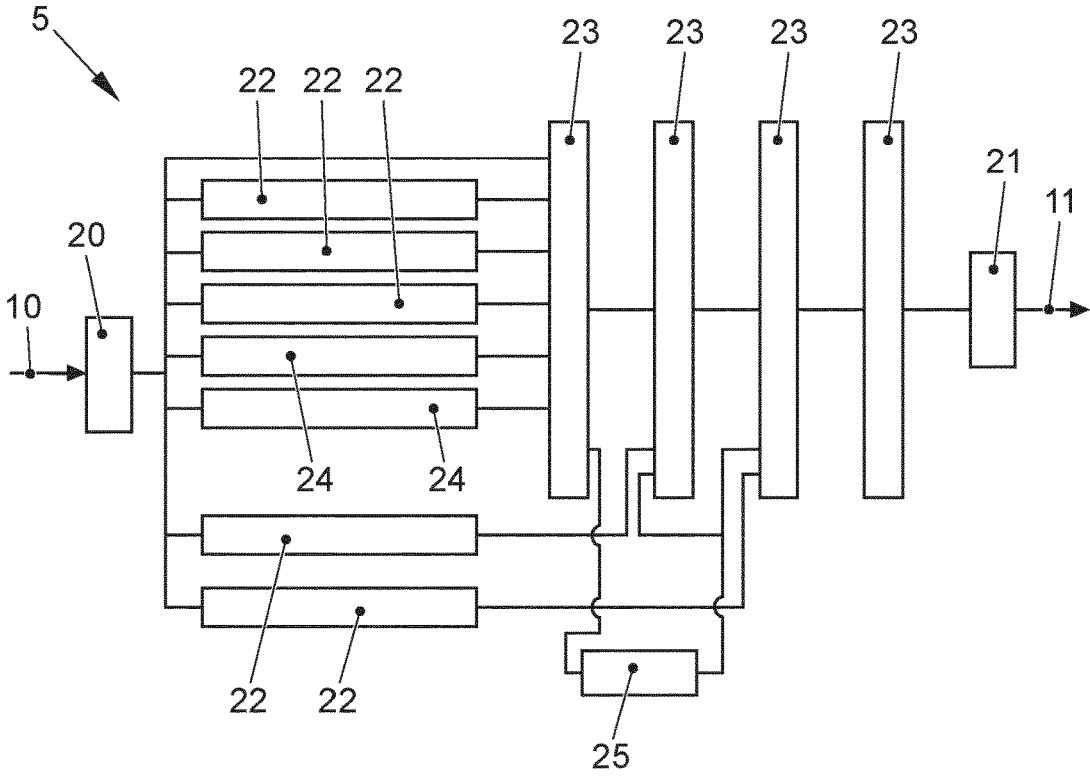
FIG. 2 shows a schematic representation of an embodiment of a deep neural network.

A schematic representation of an embodiment of a deep neural network 5 is shown in FIG. 2. The deep neural network 5 has an input layer 20 and an output layer 21.

The input layer 20 is followed by multiple filter channels 22, the parameters of which are randomly initialized during the initializing of a deep neural network 5 before a training phase and are subsequently gradually taught during training. Behind the filter channels 22 there follow multiple layers 23 of the deep neural network 5, which are trained in a monitored manner, in the context of the training phase, in particular by means of methods such as backpropagation, on the basis of a training data set.

If the deep neural network 5 executes, for example, a perception function in captured camera data, the input data and the output data thus comprise filter channels 22 of two dimensions each.

The deep neural network 5 also comprises, in addition to the filter channels 22 which are to be taught or which are taught, multiple classic filters 24, 25. In the case of the perception function mentioned, the classic filters 24 may be, for example, image processing filters which each execute a computer-vision method on the captured camera images. In order to be particularly discriminative, filter parameters of the classic filters 24, 25 are fixed when the deep neural network 5 is initialized, that is to say that the filter parameters are not randomly initialized as in the case of the filter channels 22. In this case, the fixed filter parameters may be selected on the basis of empirical values, for example.

As may be seen in FIG. 2, the classic filters 24 are operated directly after the input layer 20 of the deep neural network 5. By contrast, the classic filter 25 is operated between layers 23 of the deep neural network 5.

The classic filter can, for example, execute one of the following methods:

Center-surround filter of varying size,

Edge filter (e.g., by means of the Canny algorithm),

Contour filter,

Corner filter,

Pattern filter (e.g., for a hexagon or another geometric figure, etc.),

Gradient filter,

Contrast pattern filter,

Writing filter for identifying writing,

Deriving a position-dependent density map for stipulating an attention filter,

Image sharpness/image blur filter, etc.

The deep neural network 5 may, for example, be configured as a convolutional neural network. The at least one classic filter 24 is then arranged in particular in the region of feature layers of the convolutional neural network, that is to say in front of a backpropagation network of the convolutional neural network.

It may be provided that filter parameters of the classic filters 24, 25 are kept constant during a training phase of the deep neural network 5.

Alternatively, it may be provided that at least one part of the filter parameters of the classic filters 24, 25 is changed during a training phase of the deep neural network 5. The filter parameters are then taught together with the remaining deep neural network 5.

In a further embodiment, it may be provided that at least one part of the filter parameters of the classic filters 24, 25 is adapted with a lower learning rate than the remaining deep neural network 5.

It may be provided that only one part of the classic filters 24, 25 is changed during the training phase by way of changing the associated filter parameters. Filter parameters of another part of the classic filters 24, 25 can, by contrast, be kept constant at the filter parameters specified during initialization.

It may also be provided that an output of a classic filter 25 is fed to multiple layers 23 of the deep neural network 5.

As a result of the method described, a deep neural network 5 is more robust with respect to interference, since considerably discriminative features are deliberately extracted by way of the classic filters 24, 25.

LIST OF REFERENCE NUMERALS

1 Device
2 Means
3 Computing apparatus
4 Memory
5 Deep neural network
6 Training data
7 Filter parameters
10 Input data
11 Output data
20 Input layer
21 Output layer
22 Filter channel
23 Layer
24 Classic filter
25 Classic filter The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "serving as an example, instance, or exemplification".

The mere fact that certain measures are recited in mutually different dependent claims or embodiments does not indicate that a combination of these measures cannot be used to advantage. Any reference signs in the claims should not be construed as limiting the scope.

What is claimed is:
1. A method for operating a deep neural network, comprising:
  operating the deep neural network with multiple layers between an input layer and an output layer, wherein at least one classic filter is used in the deep neural network between the input layer and the output layer in parallel to at least one filter channel;
  conducting a training phase of the deep neural network, wherein filter parameters of the at least one classic filter are selected on the basis of empirical values and fixed during the training phase of the deep neural network, and wherein filter parameters of the at least one filter channel are randomly initialized;
  feeding output data from the at least one classic filter to a backpropagation network of the deep neural network in addition feature maps extracted by the at least one filter channel; and
  conducting an inference phase of the deep neural network for the operation of a driver assistance system of a vehicle, wherein the filter parameters of the at least one classic filter remain fixed during the inference phase of the deep neural network.
2. The method of claim 1, comprising: conducting a training phase of the deep neural network, wherein at least one part of filter parameters of the at least one classic filter is changed during the training phase of the deep neural network.

3. The method of claim 2, wherein at least one part of the filter parameters of the at least one classic filter is adapted with a lower learning rate than the remaining deep neural network.
4. The method of claim 1, wherein the at least one classic filter is operated directly after the input layer and/or in the vicinity of the input layer of the deep neural network.
5. The method of claim 1, wherein an output of the at least one classic filter is fed to multiple layers of the deep neural network.
6. The method of claim 1, wherein the deep neural network is a convolutional neural network.
7. The method of claim 2, wherein the at least one classic filter is operated directly after the input layer and/or in the vicinity of the input layer of the deep neural network.
8. The method of claim 3, wherein the at least one classic filter is operated directly after the input layer and/or in the vicinity of the input layer of the deep neural network.
9. The method of claim 2, wherein an output of the at least one classic filter is fed to multiple layers of the deep neural network.
10. The method of claim 3, wherein an output of the at least one classic filter is fed to multiple layers of the deep neural network.
11. The method of claim 4, wherein an output of the at least one classic filter is fed to multiple layers of the deep neural network.
12. The method of claim 2, wherein the deep neural network is a convolutional neural network.
13. The method of claim 3, wherein the deep neural network is a convolutional neural network.
14. The method of claim 4, wherein the deep neural network is a convolutional neural network.
15. A device for operating a deep neural network, the device having a processor configured to:
  operate the deep neural network with multiple layers between an input layer and an output layer, wherein at least one classic filter is used in the deep neural network between the input layer and the output layer in parallel to at least one filter channel;
  conduct a training phase of the deep neural network, wherein filter parameters of the at least one classic filter are selected on the basis of empirical values and fixed during the training phase of the deep neural network, and wherein filter parameters of the at least one filter channel are randomly initialized;
  feed output data from the at least one classic filter to a backpropagation network of the deep neural network in addition feature maps extracted by the at least one filter channel; and
  conduct an inference phase of the deep neural network for the operation of a driver assistance system of a vehicle, wherein the filter parameters of the at least one classic filter remain fixed during the inference phase of the deep neural network.
16. A non-transitory computer-readable storage medium comprising commands which, when run by a computer, prompt the computer to:
  operate a deep neural network with multiple layers between an input layer and an output layer, wherein at least one classic filter is used in the deep neural network between the input layer and the output layer in parallel to at least one filter channel;
  conduct a training phase of the deep neural network, wherein filter parameters of the at least one classic filter are selected on the basis of empirical values and fixed during the training phase of the deep neural network, and wherein filter parameters of the at least one filter channel are randomly initialized;

feed output data from the at least one classic filter to a backpropagation network of the deep neural network in addition feature maps extracted by the at least one filter channel; and conduct an inference phase of the deep neural network for the operation of a driver assistance system of a vehicle, wherein the filter parameters of the at least one classic filter remain fixed during the inference phase of the deep neural network.

* * * * *